July 5, 1949.  E. S. WHITE  2,474,964
PUSHCART
Filed Oct. 24, 1946  2 Sheets-Sheet 1
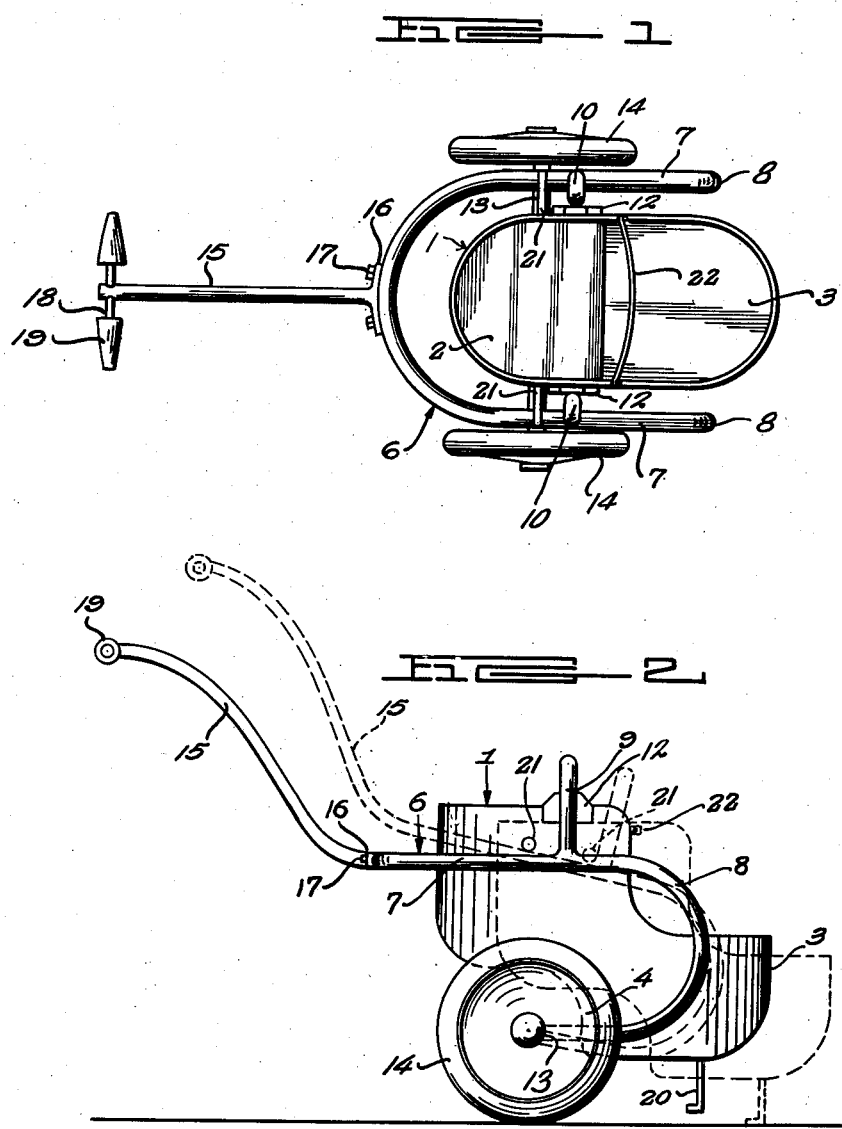
Inventor
Eldridge S. White
By Clarence A. O'Brien
and Harvey B. Jacobson
Attorneys July 5, 1949.   E. S. WHITE   2,474,964
PUSHCART
Filed Oct. 24, 1946   2 Sheets-Sheet 2
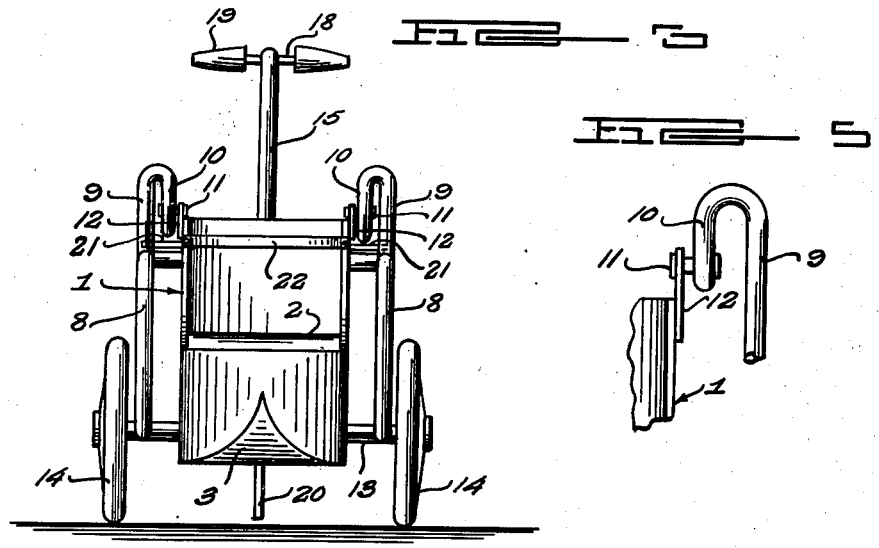
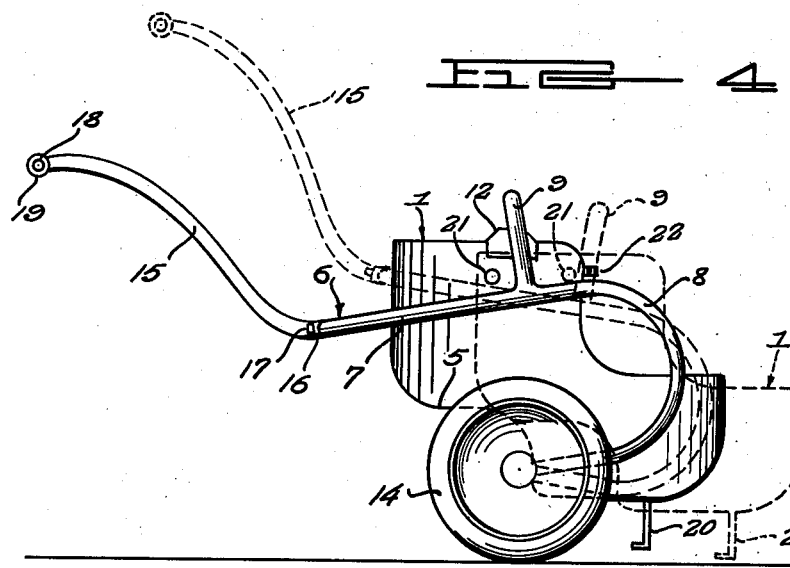
Inventor
Eldridge S. White
By Clarence A. O'Brien
and Harvey B. Jacobson
Attorneys Patented July 5, 1949

2,474,964

UNITED STATES PATENT OFFICE 2,474,964

PUSHCART

Eldridge S. White, Florence, Ala.

Application October 24, 1946, Serial No. 705,467

2 Claims. (Cl. 280—60)

My invention relates to improvements in push carts for transporting children, particularly infants, the primary object in view being to provide a sulky type push cart with a body swingable freely about a transverse horizontal axis and balanced to assume horizontal position, the cart being equipped for preventing, at will, tilting of the body forwardly about said axis.

Another object is to provide a cart of the character indicated which is simple in construction, easy to operate and comparatively inexpensive to manufacture.

Other and subordinate objects, also comprehended by my invention, together with the precise nature of my improvements and the advantages thereof, will be readily understood when the succeeding description and claims are read with reference to the drawings accompanying and forming part of this specification.

In said drawings:

Figure 1 is a view in top plan of my improved push cart in a preferred embodiment thereof.

Figure 2 is a view in side elevation showing the parts, in full lines, positioned to provide for free swinging of the body, and, in dotted lines, positioned to rest the body on the ground.

Figure 3 is a view in front elevation with the parts shown in the full line position of Figure 2.

Figure 4 is a view in side elevation, the parts being shown in full lines as positioned to prevent forward tilting of the body, and, in dotted lines, positioned for free swinging of the body into horizontal position when the cart descends from a higher to a lower level.

Figure 5 is a fragmentary view in front elevation drawn to a larger scale and illustrating one of the uprights and one of the pivot studs and hanger plates for suspending the body.

Referring to the drawings by numerals, according to the preferred embodiment illustrated, my improved push cart comprises a body 1 of oval form in plan having a rear end seat 2 therein and a stepped down front foot rest section 3 forming a substantially vertical, bottom, abutment wall 4 on said body facing rearwardly and curving into the bottom 5 of the seat 2. The body 1 may be formed of any suitable, light, strong material.

A U-shaped yoke 6 straddles the body 1 with forwardly extending side arms 7 having downwardly and rearwardly curved front ends 8, and a pair of uprights 9 arising from the approximate center of the arms and terminating in downturned ends 10 with lateral studs 11 thereon aligned transversely of the yoke and disposed at opposite sides of the body 1.

A pair of hanger plates 12 swingable on the studs 11 and suitably fixed to opposite sides of the body 1 suspend the body from said studs so that said body is suspended in the yoke 6 for swinging therein about an axis transverse to the yoke, and the body. The body 1 is balanced in any suitable manner, with its center of gravity in vertical alignment with the studs 11 to normally assume a horizontal position.

An axle bar 13 carrying a pair of rubber tired ground wheels 14 is rigidly connected, in any suitable manner, to the terminals of the side arms 7 in the rear of and opposite the abutment wall 4.

A handle-bar 15 extends rearwardly from the yoke 6, in the longitudinal center thereof, with a front end cross-bar 16 bolted, as at 17, to said yoke, and a rear end cross-rod 18 thereon having end hand-grips 19 of rubber, or the like, thereon whereby both hands may be used in manipulating the handle-bar 15 easily and conveniently.

A bar-like leg 20 depends from the bottom of the body 1 adjacent the front end thereof for engagement with the ground when the cart is at rest.

A pair of stop pins 21 extend laterally from opposite sides of the body 1, above the side arms 7, and in the rear of the uprights 9, for a purpose presently seen.

A breast bar 22 extends across the body 1, in front of the seat 2 and is suitably fixed to said body to prevent an occupant of the seat 2 from falling forward.

The yoke 6, including the uprights 9, is preferably formed of a single piece of steel tubing, also the handle-bar 15 with the exception of the cross-rod 18.

In operating the described cart, the same is propelled along the ground by pushing, or pulling, on the handle-bar 15, as will be necessary. As shown in Figure 2 in full lines, if said handle-bar 15 is held so that the yoke 6 is substantially horizontal, the body 1 is positioned so that the abutment wall 4 is spaced forwardly of the axle bar 13 and hence the body 1 is suspended for free swinging normally in horizontal position, under the influence of gravity. As shown in dotted lines in Figure 2, if the handle-bar 15 is elevated sufficiently to tilt the yoke 6 forwardly and downwardly about the axis of the wheels 14, the body 1 may be swung about said axis forwardly and downwardly until the leg 20 engages the ground. In this position of the body 1, the side arms 7 engage the stop pins 21 and prevent further tilting of the yoke 6 and also turning of the body 1 about its horizontal axis of swinging movement, under the thrust exerted against the body by the leg 20. Thus, the body 1 and the cart may be brought to rest. As shown in full lines in Figure 4, if the handle-bar 15 is depressed sufficiently to tilt the yoke 6 downwardly and rearwardly about the axis of the wheels 14, the body 1 may be swung about said axis until the abutment wall 4 is moved rearwardly against the axle bar 13. In this position of the parts, the body 1 cannot tilt forwardly about its transverse axis of swinging movement and may be held horizontal as will be clear. As shown in dotted lines in Figure 4, if the handle-bar 15 is elevated sufficiently to tilt the yoke forwardly and downwardly, for instance when the wheels 14 move down a curb, not shown, the body 1 will be swung about the axis of said wheels 14 forwardly and downwardly and the abutment wall 4 thereby spaced from the axle bar 13 so that the body is free to swing about its transverse axis of swinging movement and to maintain a horizontal position.

The foregoing will, it is believed, suffice to impart a clear understanding of my invention and the advantages thereof, without further explanation.

Manifestly, the invention, as described, is susceptible of modification both as regards structure and combination of parts without departing from the inventive concept, and right is herein reserved to such modifications as fall within the scope of the appended claims.

What I claim is:

1. In a cart of the class described, an axle bar having wheels thereon, a yoke having side arms with downwardly and rearwardly curved front ends fixed to said axle bar whereby said yoke is tiltable about said axle bar forwardly and rearwardly, a handle-bar on said yoke for tilting the same, a body suspended from said side arms to swing in said yoke about an axis parallel to and above the axle bar, said body being balanced to maintain horizontal position while being freely tiltable about said axis forwardly and rearwardly and being swingable forwardly and rearwardly about said axle bar while in horizontal position upon tilting of said yoke forwardly and rearwardly respectively, and an abutment on the bottom of said body for engagement with the axle bar when said body is moved rearwardly upon tilting of said yoke rearwardly whereby said body is prevented from tilting forwardly about said axis.

2. In a cart of the class described an axle bar having wheels thereon, a yoke having side arms with downwardly and rearwardly curved front ends fixed to said axle bar whereby said yoke is tiltable about said axle bar forwardly and rearwardly, a handle-bar on said yoke for tilting the same, a body suspended from said side arms to swing in said yoke about an axis parallel to and above the axle bar, said body being balanced to maintain horizontal position while being freely tiltable about said axis forwardly and rearwardly and being swingable forwardly and rearwardly about said axle bar while in horizontal position upon tilting of said yoke forwardly and rearwardly respectively, and stops on said body for engagement by said side arms to limit forward tilting of said yoke, said body having a leg depending therefrom for engagement with the ground when said side arms engage said stops whereby said body may be rested on the ground in the limit of forward tilting of said yoke.

ELDRIDGE S. WHITE.

REFERENCES CITED

The following references are of record in the file of this patent:

UNITED STATES PATENTS

| Number | Name | Date |
| --- | --- | --- |
| 452,969 | O'Neill | May 26, 1891 |
| 2,121,224 | Garlinghouse, Jr. | June 21, 1938 |

FOREIGN PATENTS

| Number | Country | Date |
| --- | --- | --- |
| 230,208 | Germany | Jan. 17, 1911 |
| 633,735 | France | Oct. 29, 1927 |
| 695,021 | France | Sept. 23, 1930 |